United States Patent
Palmquist

(10) Patent No.: US 6,227,007 B1
(45) Date of Patent: May 8, 2001

(54) SUBMERGED GLASS DELIVERY THROAT AND DELIVERY METHOD

(75) Inventor: Ronald W. Palmquist, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/264,154

(22) Filed: Mar. 5, 1999

Related U.S. Application Data

(60) Provisional application No. 60/076,969, filed on Mar. 5, 1998.

(51) Int. Cl.[7] .............................. C03B 40/00; C03B 5/20; C03B 5/44
(52) U.S. Cl. .................. 65/26; 65/135.1; 65/137; 65/339; 65/342; 65/356; 65/374.12
(58) Field of Search ................. 65/26, 134.1, 135.1, 65/137, 339, 342, 346, 347, 356, 374.12

(56) References Cited

U.S. PATENT DOCUMENTS

| | | |
|---|---|---|
| 2,127,087 | * 8/1938 | Mulholland . |
| 3,206,295 | * 9/1965 | Mattern . |
| 3,429,684 | * 2/1969 | Plumat . |
| 3,457,059 | * 7/1969 | Boettner . |
| 3,997,710 | * 12/1976 | Maddox . |
| 4,029,887 | 6/1977 | Spremulli .................... 13/6 |
| 4,352,687 | * 10/1982 | Boettner . |
| 4,365,987 | 12/1982 | Boettner .................... 65/137 |
| 4,388,721 | * 6/1983 | Hall, Jr. et al. . |
| 4,426,217 | * 1/1984 | Farrar et al. . |
| 4,726,831 | * 2/1988 | Fogle et al. . |
| 5,961,686 | * 10/1999 | Chenoweth . |

OTHER PUBLICATIONS

Van Vlack, Lawrence H., Elements of Materials Science and Engineering, Sixth ed, p. 517, 2–1990.*
Hackh's Chemical Dictionary, fourth ed., p. 491, 1969 (no month available).*

* cited by examiner

Primary Examiner—Sean Vincent
(74) Attorney, Agent, or Firm—Milton M. Peterson; Angela N. Nwaneri

(57) ABSTRACT

Process and apparatus are disclosed for delivering molten thermoplastic material from one chamber to another through a throat in a refractory wall separating said chambers. A refractory metal conduit is positioned within said refractory throat below the level of the floor of said chambers, and standpipes at each end of said conduit extending above the level of said floors, create stagnant thermoplastic material about the conduit so as to prevent corrosion products from flowing away from about the conduit and thereby also preventing fresh thermoplastic from replacing it. The stagnant material becomes enriched with corrosion products, which with the absence of flow retards further corrosion of the refractory about the conduit.

19 Claims, 1 Drawing Sheet

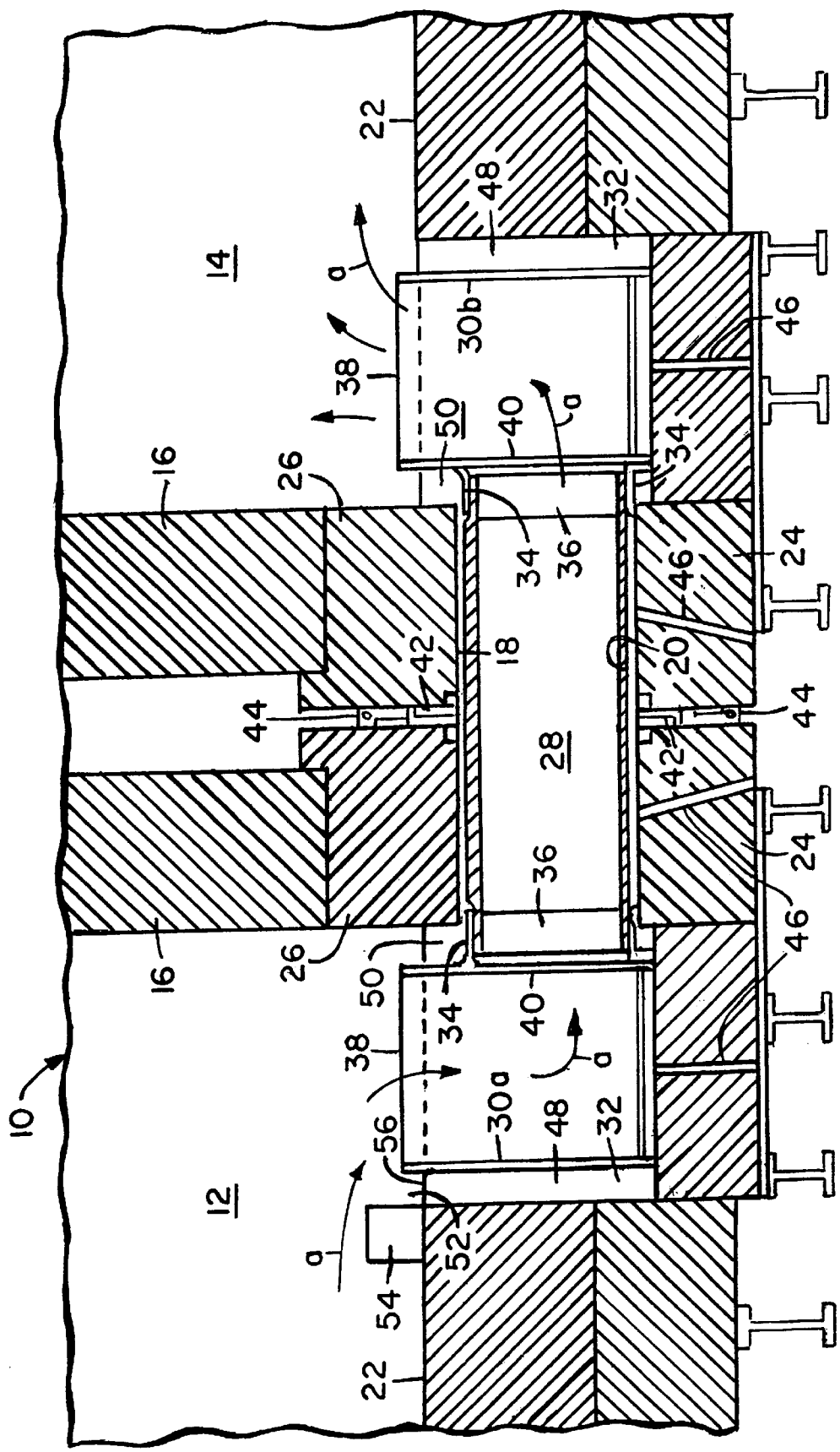

SUBMERGED GLASS DELIVERY THROAT AND DELIVERY METHOD

This application is based upon the provisional application Serial No. 60/076,969, filed Mar. 5, 1998, which we claim as the priority date of this application.

FIELD OF THE INVENTION

The present invention relates to the delivery of molten glass from one portion of a glass melting furnace of another portion thereof, and more particularly to an improved method and apparatus for delivering molten glass through a submerged throat within a glass melting tank while inhibiting the corrosion of refractory surrounding the submerged throat.

BACKGROUND OF THE INVENTION

The conventional method of conveying glass through a refractory wall within a glass melting tank is to incorporate the use of a channel made of refractory block. The channel or throat is generally located at the bottom of a bridgewall of the furnace, and is utilized to flow the molten glass from a melting chamber into an adjacent refining chamber, or for flowing the glass out of the furnace to be cooled in a forehearth. When there is molten glass on both sides of the wall dividing the various chambers, the throat or channel could be as simple as a hole in the wall. However, the action of the flowing molten glass tends to corrode the roof of the refractory channel, and typically the first part of the furnace to wear out is the throat area.

Thus, the effective life of glass melting furnaces is limited by the corrosion of the throats connecting the melting and fining zones or chambers, and those throats connecting the fining and refiner zones or chambers. The fining zone may be operated at temperatures above 1500° C., so the walls and throats associated therewith suffer severe corrosion. The roof of the throats suffers the greatest corrosion, and even fused zirconia block is corroded away over time until the refractory is so thin that a glass leak can occur.

Refractory metal pipes, such as molybdenum pipes, have been used in the past to convey some glasses from the bottom of a tank through a sidewall thereof into a distribution channel, such as shown in U.S. Pat. No. 4,029,887 to Spremulli. The flow of certain molten glasses through the moly pipe results in very small corrosion to the pipe per se. However, where the pipe passes through the sidewall, the corrosion of the surrounding refractory can be significant. The mechanism creating such high corrosion is known in the industry as upward drilling. That is, whenever there is a horizontal refractory surface with glass flowing therebeneath, bubbles in the glass will rise up until they hit the surface. The bubbles then tend to enhance corrosion due to a surface tension gradient on the bubbles, and the bubbles then in effect drill a hole into the refractory.

The dense corrosion products formed between the flowing glass and the corroded refractory then flow away, and fresh glass enters the area between the pipe and the refractory to repeat the corrosion process. When a molybdenum pipe is passed through a hole in the sidewall of a glass tank to flow molten glass from the tank, such as in the Spremulli patent, the refractory above the pipe will continue to corrode away even though the glass flows through the pipe. The corrosion of the refractory continues because there is nothing to prevent the dense corrosion products from flowing away. Eventually, there is very little refractory separating the glass from a water cooled outer rim of a refractory metal flange surrounding the pipe, and the process must be shut down before a glass leak occurs.

U.S. Pat. No. 4,365,987 to Boettner discloses the use of water cooled molybdenum flanges to prevent leaks between adjacent portions of a glass delivery system. However, the Boettner patent is primarily directed to a refractory metal glass delivery system of molybdenum for controlling the flow of glass from a furnace to a forehearth by means of a flow control device incorporated therein. The inlet to the flow control system is at a level above the bottom of the furnace, and no means are provided for inhibiting or virtually eliminating the corrosion of the refractory block about the inlet end of the delivery tube. Accordingly, the corrosion of the refractory wall through which the pipe passes limits the life of the delivery system.

Over the years attempts have been made to install throats within glass furnaces protected by refractory metal conduits such as molybdenum. However, such attempts have not been completely successful since no effort had been made to protect the refractory material surrounding the conduit from the corrosive effects of the glass on the outside of the conduit adjacent the surrounding refractory material. The use of a water-cooled flange about the conduit has helped to prevent complete flow through of the molten glass along the length of the conduit, but has not succeeded in preventing the corrosion of the refractory material adjacent the inlet and outlet ends and along the upper surface of the conduit. The present invention is directed to overcoming these deficiencies.

It thus has been an object of the present invention to provide method and apparatus for virtually eliminating or inhibiting the corrosion of refractory material about a refractory metal delivery system within a glass melting furnace.

SUMMARY OF THE INVENTION

The present invention sets forth method and apparatus for delivering molten glass from one zone or chamber of a glass melting furnace into another zone or chamber, through a submerged throat while inhibiting and virtually eliminating detrimental corrosion of refractory material forming a portion of the throat structure. A refractory metal pipe or conduit is positioned within the throat at a level below the level of the furnace floors on both sides of a dividing wall between the adjacent chambers. A closed bottom vertical pipe or conduit, hereinafter referred to as a standpipe, is positioned at each end of the refractory metal conduit, each of which has an upper end projecting above the floor of the furnace, such that the molten glass enters and exits the submerged throat at a point above the floor of the furnace by reason of the upper extent of the standpipes.

Accordingly, the glass between the refractory metal parts of the delivery system and the surrounding refractory becomes stagnant, and will eventually become enriched in corrosion products. Due to the enrichment of the glass with the corrosion products adjacent the delivery system, and the fact that such products are in a stagnant condition, there is no flowing away of the corrosion products which would allow fresh glass to replace it and therefore cause further corrosion. It is this enrichment and absence of flow that retards or virtually eliminates further corrosion of the adjacent refractory. Accordingly, a key factor of the invention is to prevent the corrosion products, which are dense, from flowing away from adjacent the conduit and thereby preventing fresh glass from replacing it. It is the use of the standpipes at the ends of a conduit, whose upper extent is below the level of the furnace floor, which create stagnation of the corrosion products in situ, and prevent additional glass from flowing into the area to cause additional corrosion.

BRIEF DESCRIPTION OF THE DRAWING

FIG. 1 is a somewhat schematic elevational view in section illustrating a preferred embodiment of the submerged throat delivery system of the present invention.

DETAILED DESCRIPTION OF THE PREFERRED EMBODIMENTS

Referring now to the drawing, a portion of a glass melting furnace 10 is shown having two zones or chambers 12, 14, separated by a bridgewall 16 having a submerged throat 18 communicating between the adjacent chambers 12 and 14. Both the upper surface defined by the bottom of cover blocks 26, and the lower surface 20 of the submerged throat 18 are below the level of the floor 22 of both chambers 12 and 14. The submerged throat 18 is formed in the bridgewall 16 and is surrounded by refractory sidewall blocks (not shown) bottom blocks 24, and cover blocks 26.

A refractory metal pipe or conduit 28 is positioned within the submerged throat 18, and first and second refractory metal vertically oriented pipes or conduits with closed bottoms, again referred to as standpipes 30a and 30b, respectively are positioned within recesses 32 formed in the floors of chambers 12 and 14 adjacent ends of the submerged throat 18. Each of the standpipes 30a and 30b has a flanged portion 34 secured to reduced end portions 36 of the refractory metal conduit or pipe 28, making a leak proof seal. The upper end 38 of the refractory metal standpipes 30a and 30b extends above the level of the floor 22 of chambers 12 and 14, and an open sidewall portion 40 of the standpipes 30a and 30b, sealed by flanges 34 to the conduit 28, provides open communication between the interior of conduit 28 and the standpipes 30a and 30b at the inlet end and outlet end, respectively, of the conduit.

A flange 42 of the refractory metal material is attached to the outer circumference of the conduit 28 with a leak tight joint. The purpose of the flange is to prevent molten glass from flowing around the outside of the conduit, since such flowing of glass would corrode the refractory blocks 24 and 26. The outside edge of the flange 42 is protected from oxidation by a water cooled ring 44. If desired, an inert gas can be blown into the ring 44 to help prevent air from entering. A plurality of purge gas tubes 46 are provided within the throat 18 and the recesses 32 below the pipe 28 and standpipes 30a and 30b to protect the refractory metal conduit 28 and standpipes 30a and 30b from oxidation until molten glass has an opportunity to surround the refractory metal parts.

While, in the present invention, a refractory metal such as molybdenum (moly) is preferred for use as the refractory metal pipe or conduit 28 and the refractory metal standpipes 30a and 30b, other materials such as tungsten, tantalum, rhenium, columbium, steel or alloys thereof may be used. Also, noble metals, such as platinum and rhodium or alloys thereof may be used where appropriate. Since moly will oxidize rapidly above about 550° C., it must be protected from oxidation until it is completely surrounded by molten glass. The standard practice is to completely cover the floor of the furnace with cullet, so that the moly conduit 28 and the moly standpipes 30a and 30b are also covered with cullet. Then as the furnace heats up, the cullet will melt and seal off oxygen from above the conduit and standpipes. In addition, two purge tubes 46 beneath the conduit 28 supply an inert gas or forming gas (8% $H_2$, 92% $N_2$) to the cavity around the conduit during startup. In addition purging gas tubes 46 supply inert gas to the recesses 32 about the moly standpipes 30a and 30b. Currently at startup, the conduit and standpipes are covered with cullet as previously mentioned and inert gas is provided to flow about the conduit 28, standpipes 30a and 30b, and flange 42 to protect the moly surfaces from oxidation until such time as the cullet is melted and flows over the moly surfaces and seals off oxygen from attacking the moly. That is, once the molten glass flows around the conduit, standpipes and moly flange, the molten glass acts as a seal and will protect the moly from oxidation. Further, the molten glass will flow along the outside of the conduit until it contacts the steel ring 40 and the cooled ring solidifies the glass to prevent further flow.

In operation, as the thermoplastic material, such as molten glass, flows from chamber 12 to chamber 14, it follows the direction of arrows a such that it flows over the top or upper edge 38 of a first standpipe 30a, through an opening 40 in a sidewall thereof communicating with the inlet end of conduit 28, and then out through a second opening 40 communicating with the outlet ends of the conduit into a second standpipe 30b, and out over an upper edge 38 of such second standpipe into chamber 14. The chamber 12 could be a melting zone and chamber 14 could be a fining zone, or in the alternative, chamber 12 could be a fining zone and chamber 14 could be a refiner, since the delivery system of the present invention can be utilized between either of these combinations.

The fact that the refractory metal conduit or pipe 28 is submerged below the level of the floor 22 of the chambers 12 and 14, and the upper ends or openings 38 of the standpipes 30a and 30b are above the level of the floor 22 of the adjacent chambers 12 and 14, creates stagnant glass about the inlet and outlet ends of the conduit 28. That is, not only does stagnant glass 48 form in the wells 32 between the standpipes 30a and 30b and the adjacent refractory block, but more importantly stagnant glass is created in the area 50 between the upper walls of the standpipes 30a and 30b and the adjacent cover blocks 26. Keeping the glass around outer walls of the conduit stagnant prevents corrosion products, which are dense, from flowing away from the conduit, which in turn prevents fresh glass from replacing it. Since the moly standpipes 30a and 30b convey the molten glass to a point above the level of the floors 22 of the furnace 10, the glass between the molybdenum parts and the surrounding refractory is therefore stagnant and will eventually become enriched in corrosion products. The standpipes at each end of the conduit 28 do not allow the refractory corrosion products to be swept away by glass flowing through the pipe. In fact, the cavity around the pipe will tend to collect the corrosion products that then settle on the floor of the furnace. The enriched corrosion products between the conduit and the surrounding refractory, and the absence of flow therebetween will then retard further corrosion of the adjacent refractory block, since fresh glass which would cause further corrosion is prevented from entering the area.

In those situations wherein it is not feasible to line the bottom of the furnace with cullet at start up so as to cover and protect the molybdenum conduit and standpipes from oxidation, such as when it is necessary to fire in tamp, ramming mixture, or the like at a high temperature, a trough or gutter 52 may be formed across the width of the furnace 10 by means of a curb wall 54. The trough 52, formed between the curb wall 54 and the bridgewall 16, has a floor 56 at the same level as the level of the floor 22. At startup then, the trough is filled with cullet, and inert gases are supplied through the purged gas tubes 36, so that when the cullet is melted there will be sufficient molten glass to cover the surfaces of the molybdenum conduit 28 and standpipes 30a and 30b so as protect the surfaces thereof from oxidation.

Although I have disclosed the now preferred embodiments of the invention it will be apparent to those skilled in the art that various changes and modifications may be made thereto without departing from the spirit and scope thereof as defined in the appended claims.

I claim:

1. A method of delivering molten thermoplastic material from one chamber to another through a refractory throat while inhibiting the corrosion of the refractory throat which comprises:

flowing molten thermoplastic material from a first chamber into a first refractory metal standpipe at a level above the level of the floor of said first chamber, flowing the molten thermoplastic material from said first standpipe into an inlet end of a refractory metal conduit positioned at a level below the level of the floor of said first chamber and the floor of a second chamber, flowing the molten thermoplastic material from an outlet end of said conduit into a second refractory metal standpipe, and flowing the molten thermoplastic material outwardly from said second standpipe into said second chamber at a level above the level of the floor of said second chamber.

2. A method of delivering molten thermoplastic material from one chamber to another through a refractory throat while inhibiting the corrosion of the refractory throat as defined in claim 1 including the steps of forming refractory corrosion products about the refractory metal parts, preventing said corrosion products from flowing away from such parts, and thereby preventing fresh molten thermoplastic material from replacing such corrosion products which would produce further corrosion of the refractory throat.

3. A method of delivering molten thermoplastic material from one chamber to another through a refractory throat while inhibiting the corrosion of the refractory throat as defined in claim 1 including the steps of creating an area of stagnant molten thermoplastic material around said refractory metal conduit, and inhibiting refractory corrosion products from being removed therefrom by the molten thermoplastic material flowing through said conduit.

4. A method of delivering molten thermoplastic material from one chamber to another through a refractory throat while inhibiting the corrosion of the refractory throat as defined in claim 1 including the steps of stagnating molten thermoplastic material between said conduit and the refractory throat, enriching said stagnated material with corrosion products, and preventing flow of additional molten thermoplastic material about said conduit to inhibit further corrosion of surrounding refractory throat material.

5. A method of delivering molten thermoplastic material from one chamber to another through a refractory throat while inhibiting the corrosion of the refractory throat as defined in claim 1 including the step of flowing the molten thermoplastic material in the form of molten glass from a first chamber in a glass melting furnace to a second chamber in said glass melting furnace through a refractory throat submerged below the level of the floor of said chambers.

6. A method of delivering molten thermoplastic material from one chamber to another through a refractory throat while inhibiting the corrosion of the refractory throat as defined in claim 1 including the steps of flowing the molten thermoplastic material in the form of molten glass from a first chamber in a glass melting furnace to a second chamber in said glass melting furnace through a first standpipe of molybdenum refractory material, a conduit of molybdenum refractory material and a second standpipe of molybdenum refractory material; stagnating molten glass in an area around said conduit; and preventing leakage of molten glass from said molybdenum parts so that fresh molten glass does not enter the stagnant area.

7. Apparatus for flowing molten thermoplastic material from one chamber to another chamber through a refractory throat communicating between said chambers while inhibiting the corrosion of the refractory throat which comprises:

a first chamber having a first floor, a second chamber having a second floor, a refractory throat communicating between said first and second chambers, having at least one surface at a level below the level of said first floor and said second floor, refractory metal conduit means positioned within said throat and having an inlet end and an outlet end, inlet means for creating a stagnant area of molten thermoplastic material between the inlet end of said conduit means and the surrounding refractory throat, and for receiving a flow of molten thermoplastic material from said first chamber and delivering such flow to the inlet end of said conduit means, and outlet means for creating a stagnant area of molten thermoplastic material between the outlet end of said conduit means and the surrounding refractory throat, and for receiving the flow of molten thermoplastic material from the outlet end of said conduit means and delivering such flow of said second chamber.

8. Apparatus for flowing molten thermoplastic material from one chamber to another chamber through a refractory throat communicating between said chambers while inhibiting the corrosion of the refractory throat as defined in claim 7 wherein said conduit means is positioned within said throat below the level of said first and second floors.

9. Apparatus for flowing molten thermoplastic material from one chamber to another chamber through a refractory throat communicating between said chambers while inhibiting the corrosion of the refractory throat as defined in claim 7 wherein said inlet means has an upper end, for receiving the flow of molten material from said first chamber, which is at a level above the level of said first floor.

10. Apparatus for flowing molten thermoplastic material from one chamber to another chamber through a refractory throat communicating between said chambers while inhibiting the corrosion of the refractory throat as defined in claim 7 wherein said outlet means has an upper end, for delivering said flow of molten material from the outlet end of said conduit means to said second chamber, which is at a level above the level of said second floor.

11. Apparatus for flowing molten thermoplastic material from one chamber to another chamber through a refractory throat communicating between said chambers while inhibiting the corrosion of the refractory throat as defined in claim 7 wherein said inlet means and said outlet means are made of refractory metal and are joined to opposite ends of said refractory metal conduit means with leak proof joints.

12. Apparatus for flowing molten thermoplastic material from one chamber to another chamber through a refractory throat communicating between said chambers while inhibiting the corrosion of the refractory throat as defined in claim 11 wherein stagnant thermoplastic material surrounds the refractory metal parts.

13. Apparatus for flowing molten thermoplastic material from one chamber to another chamber through a refractory throat communicating between said chambers while inhibiting the corrosion of the refractory throat as defined in claim 7 wherein water cooled flange means is provided about said conduit means intermediate its ends for preventing the flow of material along the outside of the conduit.

14. Apparatus for flowing molten thermoplastic material from one chamber to another chamber through a refractory throat communicating between said chambers while inhibiting the corrosion of the refractory throat as defined in claim 7 wherein said first chamber is a melting chamber of a glass melting furnace and said second chamber is a fining chamber of said furnace, and said inlet and outlet means are standpipes connected to each end of said conduit means for flowing molten glass between said melting and fining chambers.

15. A delivery system for delivering molten glass from one zone of a glass melting furnace through a refractory throat to another zone thereof while inhibiting the corrosion of the throat which comprises:

a first zone having a first floor, a second zone having a second floor, a refractory throat communicating between said first zone and said second zone, having an upper surface at a level below the level of said first and second floors, corrosion resistant conduit means positioned within said refractory throat so as to at least partially lie at a level below the level of said first and second floors, and having an inlet end and an outlet end, corrosion resistant inlet means connected to the inlet end of said conduit means for receiving a flow of molten glass from said first zone at a level above the level of said first floor and for delivering such flow to the inlet end of said conduit means, and corrosion resistant outlet means connected to the outlet end of said conduit means for receiving the flow of molten glass from the outlet end of said conduit means and for delivering such flow to said second zone at a level above the level of said second floor.

16. A delivery system for delivering molten glass from one zone to a glass melting furnace through a refractory throat to another zone thereof while inhibiting the corrosion of the throat as defined in claim 15 wherein said inlet means includes means extending above the level of said first floor for creating an area of stagnant glass about the inlet end of said conduit means and for preventing such stagnant glass from flowing away therefrom, and wherein said outlet means includes means extending above the level of said second floor for creating an area of stagnant glass about the outlet end of said conduit and for preventing such stagnant glass from flowing away therefrom.

17. A delivery system for delivering molten glass from one zone of a glass melting furnace through a refractory throat to another zone thereof while inhibiting the corrosion of the throat as defined in claim 16 wherein said corrosion resistant means are made of molybdenum in open communication with one another and secured together with leak proof joints to prevent molten glass from leaking into the stagnant areas.

18. A delivery system for delivering molten glass from one zone of a glass melting furnace through a refractory throat to another zone thereof while inhibiting the corrosion of the throat as defined in claim 15 wherein a trough extends across the width of at least one of said zones having a bottom surface at the same level as that of the zone floor and defined by a curb wall and a bridge wall above the refractory throat.

19. A delivery system for delivering molten glass from one zone of a glass melting furnace through a refractory throat to another zone thereof while inhibiting the corrosion of the throat as defined in claim 15 wherein one of said zones is a forehearth.

* * * * *